(No Model.)
W. H. SILVER.
EGG BEATER.
No. 341,697. Patented May 11, 1886.
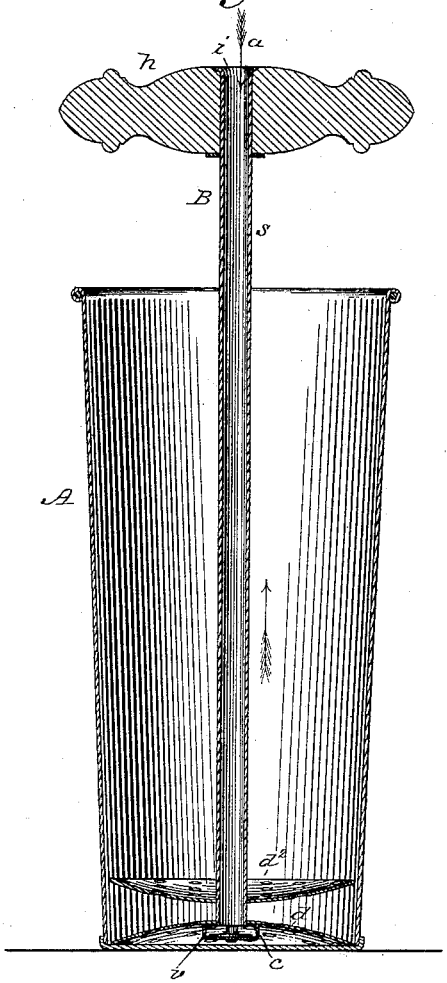
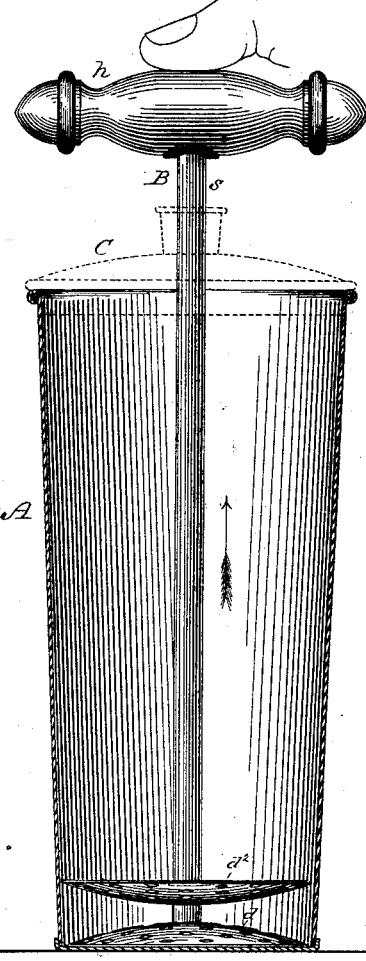
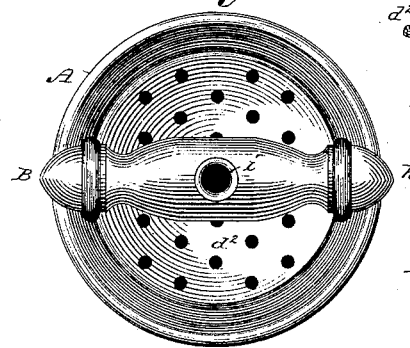
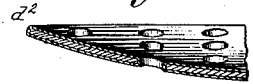
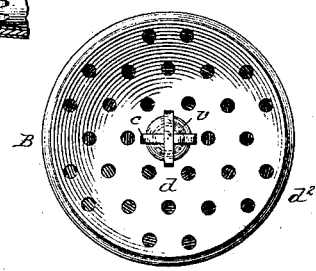
Witnesses:
Ed. A. Newman.
Al. C. Newman.
Inventor:
WILLIAM H. SILVER,
By his Attorney
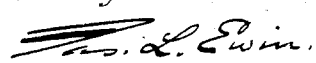

UNITED STATES PATENT OFFICE.

WILLIAM H. SILVER, OF NEW YORK, N. Y.

EGG-BEATER.

SPECIFICATION forming part of Letters Patent No. 341,697, dated May 11, 1886.

Application filed June 12, 1885. Serial No. 168,511. (No model.)

*To all whom it may concern:*

Be it known that I, WILLIAM H. SILVER, a citizen of the United States, residing at New York, in the State of New York, have invented a new and useful Improvement in Egg-Beaters, of which the following is a specification.

In "beating" or whipping-up eggs and making egg mixtures the primary object, whatever the mode of operation, is to fill the same with air, or, in other words, to aerate them as thoroughly as possible. Consequently it is a desideratum that the air forced or worked into the eggs shall be retained therein or in the mixture, and the quantity retained, with the manner in which it is retained and distributed, determines the quality of the product. Thus in making "sponge-cake" and "meringue" mixtures (the most general uses made of egg-beaters) the object is to have the eggs whipped up as light as possible—*i. e.*, so as to form the largest possible bulk, and so as to be at the same time very "firm" or "strong" or free from liability to "fall" or resume a liquid consistency when cut.

It has heretofore been difficult or impossible to accomplish said object in using egg-beaters, owing to lack of means for controlling the operation properly.

The object of this invention is to provide such means, which I accomplish by providing a reciprocating beater or dasher having a tubular stem and an air-valve, with a suitable handle, and an inlet to said stem at its upper end, so formed and arranged that said inlet can be conveniently opened and closed at will by some part of the hand which grasps said handle. This provides for "drawing down" large air-bubbles after filling or puffing up the eggs with air, and by such alternation of treatment thoroughly aerating the eggs, so that they will readily stand, having sugar or flour stirred into them, and the product will have a relatively close, uniform texture, while of maximum bulk for the quantity of its ingredients.

A sheet of drawings accompanies this specification as part thereof.

Figure 1 of these drawings represents a vertical section of an egg-beater, illustrating this invention; and Fig. 2, a like section through the receptacle, showing the dasher in elevation, the respective views being adapted to represent the aforesaid alternate operations and an immaterial modification. Fig. 3 is a top view of the egg-beater as shown in Fig. 1. Fig. 4 is a bottom view of the dasher, and Figs. 5 and 6 represent magnified sections of one of the dasher-disks and the dasher-stem.

Like letters of reference indicate the same or corresponding parts in the several figures.

This egg-beater is composed of an upright tapering receptacle, A, made of sheet metal in the example, but which may be of any suitable material and capacity, and a reciprocating dasher, B, of peculiar construction, with or without a cover, C, Fig. 2, for the receptacle. The dasher B has a tubular stem, $s$, and a pair of concavo-convex perforated disks, $d\ d^2$, fastened back to back on said stem at its lower end. These parts are preferably made of tin (tin-plate) and retinned after they are formed, so as to coat their edges and to close the lap seam of the tube, as shown in Figs. 5 and 6, to prevent rust, and to render the stem air-tight, or substantially so. The upper disk, $d^2$, is made a little larger in diameter than the lower disk, so that both may work as close as possible in the tapering receptacle.

Within the concavity of the lower disk, $d$, a valve, $v$, Figs. 1 and 4, is applied to the lower end of the tubular stem, and a cage, $c$, therefor is formed by crossed strips of metal soldered at their ends to said disk. These parts are preferably made of German silver, so as not to rust, and, being below the lower disk, may be readily cleansed thoroughly, while in operation they preclude the entrance of the eggs or mixture into the tube, and so provide for keeping the latter clean. They are protected against being battered by the depending edges of the disk. A cross-bar handle, $h$, is made fast on the upper end of the stem $s$ between a fast collar on the latter and its spread upper end, as shown in Fig. 1, the air-passage of the stem being thus extended upward therethrough to form the air-inlet $i$ of the dasher, which can consequently be readily opened and closed at will by means of the thumb or other part of the hand which works the dasher, as indicated in Fig. 2. This provides in the best way known to me for alternately opening and closing said inlet in the manner and for the purposes hereinbefore set forth.

Fig. 1 represents the upstrokes of the dasher with said inlet $i$ open. During each such stroke air flows downward through the stem $s$, as represented by the arrow $a$, to fill the partial vacuum formed beneath the rising disks $d\ d^2$, and in the succeeding downstrokes this air, displaced by the descending disks, is forced upward through their holes and distributed throughout the mass, but unavoidably in relatively large air-bubbles at first. Now, instead of drawing the dasher up through the aerated upper portion of the eggs or mixture to break the larger bubbles, as heretofore, which soon destroys the "life" of the mass and renders it incapable of maximum aeration, I work the dashers in the lower strata alone, and next close the air-inlet $i$, as illustrated by Fig. 2. The partial vacuum now formed below each disk in each succeeding upstroke is filled from the large air-bubbles in the overlying mass, which are thus "drawn down," and in the succeeding downstrokes additional small air-cells are formed from the same air.

The respective operations may be repeated until the mass assumes the desired consistency. The beaten mass is finally withdrawn from the receptacle in withdrawing the dasher, which is facilitated by the tapering or flaring form of the receptacle. This also facilitates thoroughly cleaning the latter, but is not considered essential to my present invention.

I am aware that a churn-dasher has been provided with a tubular stem having an air-inlet in its upper end and a valve near its lower end, for the purpose of forcing air through cream in making butter. Owing to the necessary size of the stem of a churn-dasher, and the manner in which a tubular stem must be grasped in operation the air-inlet of such stem could not be conveniently opened and closed by the hand which works the dasher, and no such operation is called for in working said churn-dasher. I provide for this peculiar operation in my egg-beater by means of a suitable handle at the upper end of the dasher-stem, so constructed and arranged as to facilitate opening and closing the air-inlet by some part of the hand which grasps said handle, as aforesaid.

Having thus described my said improvement in egg-beaters, I claim as my invention and desire to patent under this specification—

In an egg-beater, a reciprocating dasher having a tubular stem with a valve at the lower end of said stem, a suitable handle attached thereto at its upper end, and an inlet to the air-passage of the stem conveniently located at said upper end of the stem, whereby said air-passage may be alternately opened and closed at will by some part of the hand which grasps said handle, substantially as herein specified, for the purpose set forth.

WILLIAM H. SILVER.

Witnesses:
DELBERT H. DECKER,
JAS. L. EWIN.